US009819023B2

(12) United States Patent
McGee et al.

(10) Patent No.: US 9,819,023 B2
(45) Date of Patent: Nov. 14, 2017

(54) CONDUCTIVE PRIMER COMPOSITIONS INCLUDING PHOSPHORUS BASED ACID BOUND TO WATER SOLUBLE POLYMER FOR A NON-AQUEOUS ELECTROLYTE ELECTRICAL ENERGY STORAGE DEVICE

(71) Applicant: Henkel AG & Co. KGaA, Duesseldorf (DE)

(72) Inventors: John D. McGee, Troy, MI (US); John Zimmerman, Taylor, MI (US); Gregory T. Donaldson, Sterling Heights, MI (US); John J. Comoford, Royal Oak, MI (US); Andrew M. Dahl, Wixom, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 119 days.

(21) Appl. No.: 14/087,845

(22) Filed: Nov. 22, 2013

(65) Prior Publication Data

US 2015/0147646 A1 May 28, 2015

(51) Int. Cl.

*H01M 4/04* (2006.01)
*H01M 4/62* (2006.01)
*H01M 4/66* (2006.01)
*C08F 230/02* (2006.01)
*C09D 133/26* (2006.01)
*C09D 143/02* (2006.01)
*C09D 185/02* (2006.01)

(52) U.S. Cl.

CPC ........... *H01M 4/622* (2013.01); *C08F 230/02* (2013.01); *C09D 133/26* (2013.01); *C09D 143/02* (2013.01); *C09D 185/02* (2013.01); *H01M 4/0404* (2013.01); *H01M 4/625* (2013.01); *H01M 2300/0017* (2013.01); *Y02E 60/13* (2013.01)

(58) Field of Classification Search

CPC .. H01M 4/622; H01M 4/1395; H01M 4/0404; H01M 4/625
USPC ................................. 429/217; 252/506, 511
See application file for complete search history.

(56) References Cited

U.S. PATENT DOCUMENTS 4,733,005 A 3/1988 Schmidt et al.
5,380,606 A 1/1995 Itou et al.
5,385,960 A 1/1995 Emmons et al.
5,478,676 A 12/1995 Turi et al.
5,770,648 A 6/1998 Antonelli et al.
5,837,776 A 11/1998 Selvarajan et al.
6,080,802 A 6/2000 Emmons et al.
6,247,808 B1 6/2001 Ma et al.
6,403,263 B1 6/2002 Roach
6,492,451 B1 12/2002 Dersch et al.
6,544,688 B1 4/2003 Cheng
6,572,790 B2 6/2003 Rahim
6,576,051 B2 6/2003 Bardman et al.
6,710,161 B2 3/2004 Bardman et al.
6,833,401 B1 12/2004 Xue et al.
6,890,983 B2 5/2005 Rosano et al.
7,009,006 B2 3/2006 Brown
7,101,921 B2 9/2006 Edwards et al.
7,179,531 B2 2/2007 Brown et al.
7,408,003 B2 8/2008 Brown et al.
8,241,524 B2 8/2012 McGee et al.
8,262,747 B2 9/2012 Ooyama et al.
8,491,729 B2 7/2013 Bammel et al.
8,597,818 B2 12/2013 Li et al.
8,883,916 B2 11/2014 Smith, II et al.
2002/0096088 A1 7/2002 Bardman et al.
2003/0008209 A1 1/2003 Rahim et al.
2003/0018103 A1 1/2003 Bardman et al.
2003/0119954 A1 6/2003 Brown
2004/0054063 A1 3/2004 Brown et al.
2009/0257171 A1 10/2009 Yamazaki et al.
2010/0175792 A1 7/2010 Dietsche et al.
2011/0091771 A1 4/2011 Sannan et al.
2011/0117381 A1 5/2011 Smith, II et al.
2012/0095131 A1* 4/2012 Kinoshita ............. H01M 4/621 523/410
2013/0171521 A1* 7/2013 Sugimoto ........... H01M 4/0404 429/211
2013/0209690 A1 8/2013 Bautista et al.

(Continued)

FOREIGN PATENT DOCUMENTS

CN 102290573 A 12/2011
CN WO 2012083537 A1 * 6/2012 ............. H01G 11/36

(Continued)

OTHER PUBLICATIONS

Otter et al., "Design Synthesis and Application of Water Soluble Phosphorus Containing Polymers," Rhodia Inc., 2006, 25 pages.
International Search Report for PCT/US2014/066738, dated Mar. 26, 2015. All references cited in the International Search Report are listed herein, or have previously been made of record.
Supplemental EP Search Report, application EP 14 86 4891 dated Mar. 3, 2017. All references cited in the Supplemental EP Search Report are listed herein, or were previously made of record.

*Primary Examiner* — Sean P Cullen
(74) *Attorney, Agent, or Firm* — Mary K. Cameron

(57) ABSTRACT

A conductive coating composition for use in electrical energy storage devices, which contain a non-aqueous electrolyte, is provided comprising an organic polymeric binder comprising one or more water-soluble polymers; water; solid conductive particles dispersed in the binder; and phosphorus based acid bound to at least one of the water-soluble polymers and present in a range of 0.025-10.0% by weight of the water-soluble polymers, as well as methods of making and using said conductive coating composition, coated current collectors and electrical energy storage devices made therefrom.

19 Claims, No Drawings

(56) References Cited

U.S. PATENT DOCUMENTS

| | | | | |
|---|---|---|---|---|
| 2013/0236785 | A1 * | 9/2013 | Zhou ...................... | H01G 11/36<br>429/217 |
| 2015/0024195 | A1 | 1/2015 | Bammel et al. | |

FOREIGN PATENT DOCUMENTS

| | | | | |
|---|---|---|---|---|
| CN | 102856530 | A | 1/2013 | |
| JP | 8134792 | A | 5/1996 | |
| JP | WO 2012036260 | A1 * | 3/2012 | .......... H01M 4/0404 |
| WO | 2009054987 | A1 | 4/2009 | |
| WO | 2012013560 | A1 | 2/2012 | |

* cited by examiner

CONDUCTIVE PRIMER COMPOSITIONS INCLUDING PHOSPHORUS BASED ACID BOUND TO WATER SOLUBLE POLYMER FOR A NON-AQUEOUS ELECTROLYTE ELECTRICAL ENERGY STORAGE DEVICE

BACKGROUND OF THE INVENTION

1. Field of the Invention

The subject invention relates to a conductive coating composition useful as a primer and/or as a conductive coating on metal surfaces of current collectors used in electrical energy storage devices which contain a non-aqueous electrolyte. The subject invention also relates to an additive for a conductive coating composition, a coated current collector, electrical energy storage devices containing a non-aqueous electrolyte incorporating any of the foregoing, and methods of making and using same.

2. Description of the Prior Art

Electrical energy storage devices containing non-aqueous electrolyte, such as lithium ion batteries and capacitors, generally include active coatings applied to a current collector to serve as a coated current collector, for example an electrode.

Lithium-ion batteries are mainly composed of a cathode and an anode, each of these electrodes comprising a different active material deposited on a current collector, in contact with electrolyte and separated by a separator. Generally, conductive metals are used as the current collector and there are several forms for current collectors: mesh, foam, foil, and the like. Metallic foils which are thin and light are preferred to improve volumetric capacity of cells. Current collectors possess high electrical conductivity to reduce cell resistance and desirably exhibit chemical stability in contact with electrolyte over the electrical potential operation window of the electrodes. Metal current collectors, while highly conductive, are often attacked by electrolyte which tends to shorten battery life.

Active coatings comprise an active material typically containing lithium, such as by way of non-limiting example, lithium iron phosphate and/or various lithium metal oxides, conductive additives and various binders. Cathodes are either oxides or phosphates containing lithium and first row transition metals, while anodes are commonly based on either carbon, such as graphite, or lithium titanium oxides.

Problems found in electrical energy storage devices containing non-aqueous electrolyte, in particular liquid electrolyte, include corrosion of the metal surface of the current collector by the electrolyte, as well as unsatisfactory adhesion of the active coating to the current collector. Both of these defects reduce efficiency and life of the electrical energy storage devices. One way to reduce such problems has been to apply a primer coating onto the metal surfaces of the current collector prior to application of the active coating. Although conductive primer coatings are commercially available, drawbacks of these products include poor electrical conductivity of the primer, i.e. lowered conductivity of the coated current collector; inadequate adhesion of the primer layer to the current collector and/or the active coating, as well as electrolyte attack on the primer coating and the underlying current collector. Another drawback of commercial conductive primers is the use of undesirable solvent-based carrier.

To improve electrical energy storage device, e.g. battery and capacitor, performance, there remains a significant need to reduce electrical resistance of current collectors having dried conductive coatings deposited thereon. As such a significant need exists to reduce electrical resistance of these dried coatings, including dried primer layers.

There remains a significant need to improve the resistance (e.g., insolubility and/or non-reactivity) of conductive coatings, in particular the conductive primer coatings, to non-aqueous electrolyte. Solving this problem is particularly challenging in the use environment, where the conductive primer coatings are exposed to electrolyte, e.g. liquid electrolyte, within electrical energy storage devices, under varying electrochemical conditions during discharge and recharge as well as at temperatures that vary from ambient to elevated temperatures. In addition, there is a need for conductive primer coatings that remain electrochemically stable over a broad range of cell voltages, that is a conductive primer coating that does not swell, delaminate, dissolve and/or react with electrolyte is still needed. This improved resistance to electrolyte desirably should not be made at the expense of conductivity and adhesion of the dried layers. There also remains a significant need to improve the adhesion properties of conductive coatings, in particular the conductive primer coatings, to the current collector. Also desirable is an active coating, having improved adhesion to the current collector, which can be applied directly to the current collector in the absence of a primer.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred; however the scope of the invention includes equivalents which are outside these limits. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules. For purposes of water-solubility of polymers, the solubility is that determined at 1 atmosphere of pressure at 25° C. Generally, water-soluble polymers are those that will form a homogeneous solution with water, while a water-insoluble polymer will remain as a separate organic phase, which is detectable by methods known in the art. The terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18-25° C.

A "conductive coating composition" as used herein includes compositions that form coatings, which conduct electricity when the compositions are dried and/or cured coatings.

The term "(meth)acryl-" will be understood by those of skill in the art to refer to methacryl- and acryl-materials, e.g. (meth)acrylate refers to both acrylate and methacrylate materials.

SUMMARY OF THE INVENTION

The invention provides a conductive primer composition that includes an organic polymeric binder comprising one or more water-soluble polymers, and phosphorus based acid bound to at least one of these polymers in selected percentages. The invention also provides an additive, which includes a water-soluble polymer having phosphorus based acid bound thereto and optionally other polymers and components, for inclusion in a conductive coating. The conductive coating compositions, i.e. primer or active coating compositions, according to the invention exhibit improved resistance of the resultant dried primer or active coating to non-aqueous electrolyte, in particular liquid non-aqueous electrolyte, improved adhesion of the resultant conductive coating as deposited on a current collector and lowered, or at least not increased, electrical resistance of the conductive coating/current collector combination, having a dried conductive primer layer and/or a dried conductive active coating.

Non-aqueous electrolyte of the electrical energy storage device may include solid, gel and/or liquid electrolyte, with the latter being preferred. Non-aqueous liquid electrolytes are understood in the art to mean aprotic electrolytes that are generally organic liquids, typically comprising less than 20 ppm water. Since water in the electrolyte will react to form HF, in extreme cases in which the battery production was not kept dry as much as 60 ppm-100 ppm may be present. Desirably the amount of water in a non-aqueous electrolyte is less than 100, 50, 25, 20 ppm. Preferably the amount of water is not more than 1, 2, 3, 4, 5 ppm, most preferably no water is present in the non-aqueous electrolyte.

Most compositions of lithium electrolytes are based on solutions of one or more lithium salts in mixtures of two or more solvents. In some electrical energy storage devices, e.g. pouch or prismatic cells, a suitable liquid non-aqueous electrolyte is typically used, for example liquid organic solvent having salts dissolved therein. Examples of suitable organic solvents include a fluorinated carbonate, ethylene carbonate, a cyclic ester, a linear ester, a cyclic ether, a linear ether or the like. Suitable salts useful as a solute in the non-aqueous electrolyte are those known in the battery and cathode industries and include for example a lithium salt. By way of non-limiting example, suitable lithium salts may include one or more of $LiClO_4$, $LiBF_4$, $LiPF_6$, $LiAsF_6$, LiCl and LiBr, and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

It is an object of the invention to provide a conductive primer composition for use on a current collector within an electrical energy storage device containing a non-aqueous electrolyte, the conductive primer composition comprising:

(a) an organic polymeric binder comprising one or more water-soluble polymers;

(b) a solvent system comprising water;

(c) phosphorus based acid bound to at least one of the water-soluble polymers and present in a range of 0.025-10.0% by weight of a total amount of the one or more water-soluble polymers; and (d) conductive particles.

It is an object of the invention to provide a conductive primer composition wherein the at least one of the one or more water-soluble polymers having phosphorus acid bound thereto is made up of at least 70 wt % of one or more monomers selected from the group consisting of acrylamide, n-methylol acrylamide, methacrylamide, n-methylol methacrylamide, vinylformamide, n-methylol vinylformamide, acrylic acid and methacrylic acid.

It is an object of the invention to provide a conductive primer composition wherein the at least one of the one or more water-soluble polymers having phosphorus acid bound thereto is a copolymer, wherein at least a portion of the one or more monomers is acrylamide.

It is an object of the invention to provide a conductive primer composition wherein the organic polymeric binder further comprises one or more water-dispersible polymers dispersed in the composition.

It is an object of the invention to provide a conductive primer composition wherein a source of the phosphorus based acid comprises at least one of vinyl phosphonic acid, vinyldiphosphonic acid, and phosphate ester monomer based on (meth)acrylic acid.

It is an object of the invention to provide a conductive primer composition further comprising a cross-linker.

It is an object of the invention to provide a conductive primer composition wherein the conductive particles are selected from the group consisting of carbon black, graphite, graphene and mixtures thereof. It is a further object of the invention to provide a conductive primer composition wherein the conductive particles comprise carbon black, graphite, and graphene, wherein the graphene and the carbon black are present in a weight ratio of approximately 0.2:1 to 5:1.

It is another object of the invention to provide a conductive primer composition for use on a current collector within an electrical energy storage device containing a non-aqueous electrolyte, the conductive primer composition comprising: water; one or more organic polymers dissolved and/or dispersed in the water; and conductive particles dispersed in the water; wherein at least one of the one or more organic polymers comprises at least 70 wt % in total of monomers selected from the group consisting of acrylamide, n-methylol acrylamide, methacrylamide, n-methylol methacrylamide, vinylformamide, n-methylol vinylformamide, acrylic acid and methacrylic acid and comprises phosphorus acid bound to the at least one of the one or more organic polymers in an amount of 0.025-10.0% by weight.

It is an object of the invention to provide an adhesion promoting additive for incorporation into a conductive coating composition used within an electrical energy storage device containing a non-aqueous electrolyte, the additive comprising: an organic polymer bearing phosphorus based acid, present in a range of 0.05-10.0% by weight of the organic polymer, wherein the organic polymer comprises at least 70% by weight of one or more monomers selected from the group consisting of acrylamide, n-methylol acrylamide, methacrylamide, n-methylol methacrylamide, vinylformamide, and n-methylol vinylformamide; and water.

It is an object of the invention to provide an additive wherein a source of the phosphorus acid groups is selected from at least one of vinyl phosphonic acid, vinyldiphosphonic acid, and phosphate ester monomer based on (meth) acrylic acid.

It is an object of the invention to provide an additive wherein the one or more monomers comprises acrylamide and, and optionally n-methylol acrylamide, and the source of the phosphorus based acid comprises vinyl phosphonic acid.

It is yet another object of the invention to provide a conductive coating composition for electrical energy storage devices containing a non-aqueous electrolyte, the conductive coating composition comprising:

an organic binder;

an active material;

conductive particles dispersed in the organic binder;

an organic polymer bearing phosphorus based acid, present in a range of 0.05-2.0% by weight of the organic polymer, different from the organic binder, wherein the organic polymer comprises at least 70% by weight of one or more monomers selected from the group consisting of acrylamide, n-methylol acrylamide, methacrylamide, n-methylol methacrylamide, vinylformamide, n-methylol vinylformamide, acrylic acid, and methacrylic acid; and present in a range of 0.1-5.0% total dry solids weight based on the conductive coating composition.

It is another object of the invention to provide a conductive coating composition wherein the phosphorus based acid is selected from at least one of vinyl phosphonic acid, vinyldiphosphonic acid, and phosphate ester monomer based on (meth)acrylic acid.

It is another object of the invention to provide a conductive coating composition wherein the conductive particles comprise at least one of carbon black, graphite, and graphene.

It is an object of the invention to provide a coated current collector for use within an electrical energy storage device containing a non-aqueous electrolyte, the coated current collector comprising:

A) a conductive metal surface; and

B) a conductive primer layer adhered directly to the conductive metal surface;

wherein the conductive primer layer comprises conductive particles and an organic polymeric binder comprising one or more organic polymers wherein at least one of the one or more organic polymers comprises 70% by weight or more of monomers selected from the group consisting of acrylamide, n-methylol acrylamide, methacrylamide, n-methylol methacrylamide, vinylformamide, n-methylol vinylformamide, acrylic acid and methacrylic acid and comprises phosphorus acid bound to the at least one of the one or more organic polymers in an amount of 0.025-10.0% by weight of a total amount of the one or more organic polymers. It is a further object of the invention to provide an electrode comprising a coated current collector as described herein having deposited on the conductive primer layer, C) an active conductive coating.

It is an object of the invention to provide a coated current collector wherein the conductive primer layer and/or the conductive coating is cross-linked.

It is an object of the invention to provide a coated current collector wherein the conductive particles include carbon black, graphite, and/or graphene.

It is a further object of the invention to provide a method of manufacturing a coated current collector for use within an electrical energy storage device containing a non-aqueous electrolyte, comprising steps of:

a.) providing a current collector comprising a metal conductive surface; and b.) applying a conductive primer composition according to any one of claims 1-10 directly to the metal conductive surface; and c.) drying, and optionally cross-linking, the conductive primer composition on the metal conductive surface to form an adherent conductive primer layer.

Optionally, methods of manufacturing a coated current collector may further comprise steps of: depositing a conductive coating composition comprising an active material on the adherent conductive primer layer before or after step c.); and drying, and optionally cross-linking, to form an electrode.

It is an object of the invention to provide an electrical energy storage device comprising: the coated current collector as described herein; and a non-aqueous electrolyte; wherein the conductive primer layer is insoluble in the non-aqueous electrolyte.

DETAILED DESCRIPTION OF THE INVENTION

In a first embodiment, the present invention provides a conductive primer composition that includes:

(a) an organic polymeric binder comprising one or more water-soluble polymers, (b) a solvent system comprising water, (c) phosphorus based acid bound to at least one of the water-soluble polymers and (d) conductive particles.

The organic polymeric binder contains one or more water-soluble polymers and may contain additional polymers which are water-dispersible.

In one aspect the organic polymeric binder may for the most part be made up of at least one water-soluble polymer having phosphorus based acid groups bound thereto. At least 50, 60, 70, 80, 90 or 99 wt % of the organic polymeric binder may be made up of water-soluble polymer(s) having phosphorus based acid groups bound thereto.

In another aspect of the organic polymeric binder, a second water-soluble polymer, different from the at least one water-soluble polymer having phosphorus based acid groups bound thereto, is also present. This second polymer or polymers may make up a majority of the organic polymeric binder, e.g. at least 50, 60, 70, 80, 90, 95 wt % up to a remainder of the organic polymeric binder necessary to accommodate the presence of sufficient water-soluble polymer having phosphorus based acid groups bound thereto to achieve the desired amount of phosphorus based acid for the composition, as described herein.

In another aspect of the organic polymeric binder, the organic polymeric binder further comprises one or more water-dispersible polymers in addition to the one or more water-soluble polymers. The water-dispersible polymers are typically organic polymers which disperse in water as a separate organic phase, which may be present as micelles in the water-based compositions of the invention. The water-dispersible polymer may constitute a majority of the organic polymeric binder, e.g. at least 50, 60, 70, 80, 90, 95 wt % up to a remainder of the organic polymeric binder necessary to accommodate the presence of sufficient water-soluble polymer having phosphorus based acid groups bound thereto to achieve the desired amount of phosphorus based acid for the composition, as described herein.

In any of the foregoing, cross-linking functional groups may be present on at least one of the polymers comprising the organic polymeric binder, desirably the cross-linking functional groups may be present on the water-soluble polymer having phosphorus based acid groups bound thereto. Optionally, a suitable cross-linker may be added as a separate component to the composition.

Examples of suitable sources of water-dispersible polymers include conventional latex polymers which may be prepared by emulsion polymerization, e.g. (meth)acrylic polymer emulsions; secondary dispersions of polymers of acrylic acid or methacrylic acid and/or copolymers prepared from (meth)acrylic acid and one or more (meth)acrylate monomers and/or styrene, as well as dispersions of copolymers of (meth)acrylic acid and olefinic monomers, such as ethylene and the like. For example, water-dispersible polymers based on esters of acrylic acid, esters of methacrylic acid, styrene, aldehydes, and the like. The nature of the water-dispersible polymers is preferred to be such that the polymer can be dispersed as an organic phase in aqueous compositions according to the invention. The organic polymeric binder can include water dispersible polymers, as described above, which do not interfere with the objects of the invention or render the composition unsuitable for use in the non-aqueous electrolyte.

The one or more water-soluble polymers are those polymers having sufficient polarity and/or hydrophilic groups in a quantity such that the polymer can be diluted in water, to form transparent solutions, which do not separate on aging for at least in increasing order of preference 1, 2, 3, 4, 5, 6, 7, 8, 9, 10, 11 or 12 weeks. Typical hydrophilic groups include oxygen and/or nitrogen—containing functional groups, for example hydroxyl, carboxylic acid, sulfonate, phosphate, amino, imino groups and the like. Water-soluble polymers as described herein are typically present in the aqueous phase of compositions according to the invention.

There are various types of polymerization methods known in the art to achieve water-soluble polymers such as, by way of non-limiting example, bulk polymerization, and solution polymerization. In one embodiment, radical polymerization is used to generate water-soluble polymers according to the invention.

Desirably polymers selected for use in the organic polymeric binder are insoluble and non-reactive with the non-aqueous electrolyte in the use environment for a current collector coated with compositions of the invention. Alternatively, even if a polymer of the organic polymeric binder is soluble in the non-aqueous electrolyte, a dried coating of the composition containing this polymer is insoluble in the non-aqueous electrolyte.

Phosphorus-based acid groups are present on at least one of the water-soluble polymers in a selected quantity in relation to the total amount of all water-soluble polymers present in the composition. In this embodiment, the amount of phosphorus based acid bound to polymer in the organic polymeric binder is measured as a percent of the total amount of the one or more water soluble polymers present in the binder. The phosphorus based acid groups can be present in an amount that is at least, with increasing preference in the order given, 0.03, 0.04, 0.05, 0.07, 0.08, 0.09, 0.1, 0.3, 0.5, 0.7, 0.9, 1.0, 1.25, 1.5, 1.75, 2.0, 2.25, 2.5, 2.75, 3.0, 3.25, 3.5, 3.75, percent by weight and independently preferably is not more than, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5 wt % of the total amount of one or more water soluble polymers (solids, meaning in the absence of solvent).

Non-limiting examples of sources of the phosphorus based acid groups can include monomers, which may be polymerized into the polymer, such as vinylphosphonic acid, vinyldiphosphonic acid, and phosphate ester monomers based on (meth)acrylic acid. In one embodiment, the phosphorus based acid group can be vinyl phosphonic acid (VPA). Alternatively, phosphorus based acid groups can be added to a polymer by chemical reactions subsequent to polymerization.

Although phosphorus based acid groups can be bound to the polymers by ordered polymerization processes, random polymerization of the polymers with the phosphorus based acid groups has been found to provide particular benefit toward adhesion of resultant conductive coating as deposited on a current collector within electrical energy storage devices in the presence on non-aqueous electrolytes.

Phosphorus-based acid groups may be imparted to the water-soluble polymer in a number of ways. For example, a monomer bearing phosphorus-based acid groups may be polymerized with other monomers directly such as by free-radical polymerization. One non-limiting example is a free radical polymerization of a mixture of monomers comprising vinyl phosphonic acid. Alternatively, phosphorus-based acid groups may be appended to the polymer after polymerization is complete. In this case, a polymer bearing precursor functional group X is prepared and is then reacted with a material Y which is reactive with precursor functional group X and also includes phosphorus-based acid groups. One non-limiting example of X is a cyclic carbonate functional monomer, such as vinylethylene carbonate, and one non-limiting example of reactive material Y is a material bearing amine groups and phosphorus-based acid groups, such as 2-aminoethylphosphonic acid.

The compositions of the invention, unless specifically described otherwise, are water-based compositions. The solvent system comprises water and optionally other solvents. Generally, the solvent system according to the invention may comprise at least 50, 60, 70, 80, 90 wt % water and can comprise 100 wt % water. The water-based compositions of the invention generally avoid added cost associated with the use of organic solvent-based systems. Another benefit of the water-based compositions is less environmental concerns in manufacture and use of the compositions. Less organic solvent in the conductive compositions tends to reduce the presence of undesirable residual organic solvent in the as-applied conductive coatings according to the invention.

In one embodiment, the solvent system is made up exclusively of water, other than small amounts of organic solvents introduced as inclusions in the other components of the composition. In some embodiments, the solvent system may include water and one or more organic solvents, for example, polar aprotic organic solvents or alcohols. Non-limiting representative examples of suitable alcohols are methanol, ethanol, propanol, isopropanol, and water-miscible glycol ethers such as propylene glycol-methyl ether. Non-limiting representative examples of suitable aprotic organic solvents include n-methyl pyrrolidone, tetrahydrofuran, dimethylformamide and dimethyl sulfoxide. Other aprotic organic solvents are known but tend to have drawbacks making them unsuitable for use in the invention. Desirably, the one or more organic solvents, if present, are included in the solvent system in amounts of less than 20, 15 or 10 wt % of the composition. In embodiments where compositions of the invention are diluted prior to application, higher amounts of organic solvent may be present as an application diluent.

The conductive particles are capable of conducting electricity, and may be solid particles which are dispersed in the composition. Desirably, the conductive particles are substantially or completely insoluble in the liquid compositions according to the invention. Desirably, the conductive particles are insoluble in non-aqueous electrolyte. It is also desirable that the conductive particles be resistant to undesirable electrochemical reaction in the use environment of the electrical energy storage device, which may include elevated temperatures of 32, 35, 37, 40, 43, 45, 48, 50, 55, 60, 65, 70, 75, 80, 85, 90, 95 or 100° C.

The conductive particles should be present in an amount sufficient to increase conductivity of dried conductive coating layers according to the invention without unduly interfering with adhesion of the dried coating layers, such that the layers are suitable for use as coatings for current collectors useful in electrical energy storage devices. Desirably, the conductive particles may be present in the primer layer in a range of, independently in increasing order of preference, at least 45, 46, 47, 48, 49, 50, 51, 52, 53, 54, 55, 56, 57, 58, 59, 60, 61, 62, 63, 64, 65, 66, 67, 68 wt %, and not more than in increasing order of preference 80, 79, 78, 77, 76, 75, 74, 73, 72, 71, 70 wt %, measured as a percent of dried coating weight.

The conductive particles may include at least one of carbon black, graphite, and/or graphene. In one embodiment, as will be discussed in more detail below, the conductive particles include two or more of carbon black, graphite, and graphene. The conductive particles may have a median particle size of 0.001 to 50 microns. In one embodiment, the conductive particles have a median particle size of at least 0.001, 0.005, 0.01, 0.02, 0.03, 0.04, 0.05, 0.07, 0.08, 0.09, 0.1, 0.3, 0.5, 0.7, 0.9, 1.0, 1.1, 1.3, 1.5, 1.7, 1.9, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25, 10.5, 10.75, 11.0, 11.5, 12.0, 12.5, 13. 13.5 microns, and independently preferably is not more than, 50, 40, 30, 20, 15 microns. It will be understood by those of skill in the art that certain conductive particles may have non-spherical morphology, such as platelets, sheets, nano-platelets, nanofibers, nano-tubules or the like. Graphene may be sheets and/or platelets. In one embodiment, nano-graphene platelets are used, which may have thickness of about 0.34-100 nm and length/width of about: 0.5-25 μm.

In one embodiment, the organic polymeric binder crosslinks with drying, in particular drying by application of heat. Polymers in the binder may contain functional groups capable of self-crosslinking, cross-linking with other polymers in the binder or cross-linking with an auxiliary crosslinking agent. Examples suitable auxiliary cross-linking agents include aminoplast cross-linkers as is known in the art, polycarbodiimides, blocked isocyanates, preferred among these are those materials which are soluble in the liquid compositions according to the invention.

Other suitable additives which may be used in compositions according to the invention include catalysts for crosslinking; biocide; wetting agents; dispersing and processing aids.

In a second embodiment, the present invention provides an additive which can be incorporated into a variety of conductive coating compositions used to form conductive coatings used in electrical energy storage devices where the coatings may be exposed to a non-aqueous electrolyte. The additive may be incorporated into conductive primer compositions or active coating compositions. Addition of sufficient amounts of compositions according to the second embodiment have been shown to improve the conductive coatings' resistance to non-aqueous electrolyte and/or improve adhesion of conductive coatings formed by drying and/or curing these conductive primer compositions or active coating compositions on metal current collectors.

The additive of the second embodiment comprises:

(a) a water-soluble polymer;

(b) a solvent system comprising water;

(c) phosphorus based acid bound to the water-soluble polymer; and optionally a pH adjuster and/or conductive particles, wherein the pH of the additive is within a range of 6-9.

The additive components (a), (b) and (c) have characteristics as described above for components of the first embodiment, except as otherwise described herein.

Non-limiting examples of the water-soluble polymer can include one or more of the following monomers polymerized: acrylamide, n-methylol acrylamide, methacrylamide, n-methylol methacrylamide, vinylformamide, n-methylol vinylformamide, acrylic acid, methacrylic acid, and acrylate. Desirably, the monomers may be polymerized in solution. In one example, at least 70 wt % of the water-soluble polymer is made up of one or more monomers selected from the group consisting of acrylamide, n-methylol acrylamide, methacrylamide, n-methylol methacrylamide, vinylformamide and n-methylol vinylformamide.

Other water-soluble polymers can also be used without departing from the scope of the present invention. For example, the organic polymeric binder can be a functionalized copolymer prepared with amide monomer which has been reacted with an aldehyde, n-methylol acrylamide being a preferred example. One means to achieve a polymer bearing n-methylol groups, such as in this example, is to directly polymerize an n-methylol bearing monomer, such as n-methylol acrylamide, with other polymerizable monomers. Alternatively, n-methylol functional groups can be imparted to the polymer after or during the polymerization by reaction of an aldehyde such as formaldehyde with amide groups within the repeating units of the polymer chain.

As noted above, phosphorus based acid bound to the water-soluble polymer may be present in a range of 0.025-10.0% by weight of the one or more water soluble polymers. In a more preferable range, the phosphorus based acid groups can be present in a range of 0.05-2.0% by weight of the water soluble polymer. Non-limiting examples of the phosphorus based acid groups can include monomers such as vinylphosphonic acid, vinyldiphosphonic acid, and phosphate ester monomers based on (meth)acrylic acid.

Alternatively, phosphorus-based acid groups may be appended to the polymer after polymerization is complete. In this case, a polymer bearing precursor functional group X is prepared and is then reacted with a material Y which is reactive with precursor functional group X and also includes phosphorus-based acid groups. In one example, a copolymer is first prepared by radical polymerization of a mixture of acrylamide, vinylphosphonic acid and vinylethylene carbonate. In this example, cyclic carbonate groups constitute precursor functional group X. Subsequently, 2-aminoethylphosphonic acid (material Y) is reacted with the precursor functional group to provide a polymer comprising phosphorus-based acid groups.

In one example of an additive according to the invention, (a) comprises a copolymer of acrylamide and vinyl phosphonic acid and the additive has a pH adjusted to 8. Another example of an additive according to the second embodiment (a) comprises a copolymer of acrylamide, n-methylol acrylamide and vinyl phosphonic acid. Another example of an additive according to the invention, (a) comprises a copolymer of acrylamide vinylformamide and vinyl phosphonic acid.

The additive may be added to a conductive coating composition in an amount that is at least, with increasing preference in the order given, 0.1, 0.2, 0.3, 0.4, 0.5, 0.6, 0.7, 0.8, 0.9, 1.0, 1.25, 1.5, 1.75, 2.0, 2.25, 2.5, 2.75, 3.0, 3.25, 3.5 weight % and independently preferably is not more than, in increasing order of preference 5.5, 5.25, 5.0, 4.75, 4.5, 415, 4.0, 3.75 weight %. Desirably, the additive can be used in conjunction with a binder of a conductive coating composition in an amount of additive in a range of 0.1-5.0 weight % based on dry solids of the conductive coating composition, and preferably in a range of from 0.2-3.5 weight %.

The conductive coating compositions into which the additive can be incorporated include compositions having binders comprised of: 1) water-soluble thermoplastic binders, 2) water-soluble thermosetting binders, 3) thermoplastic organo-soluble binders, 4) thermosetting organo-soluble binders, and mixtures thereof. Non-limiting examples of these binders include mixtures of hydroxyethyl cellulose and aminoplast crosslinking agents, oil in water type emulsions, ammoniated ethylene acrylic acid copolymer dispersions, and an acrylic polyol in the form of a latex with a melamine crosslinker. In the second embodiment, at least one of the additive and the conductive coating composition into which the additive is incorporated may include (c) conductive particles.

In accordance with the foregoing disclosure, another embodiment of the subject invention includes a coated current collector, e.g. an electrode, for use within a non-aqueous electrolyte in an electrical energy storage device. The coated current collector includes a current collector, e.g. an aluminum foil substrate, and a conductive primer coating adhered to the current collector. In this embodiment, the conductive primer coating which overlays the current collector can include any of the features of the conductive primer coatings and the conductive primer compositions, as dried, as described in this disclosure.

In accordance with the foregoing disclosure, the subject invention also includes a method of manufacturing a coated current collector, e.g. an electrode, for use within electrical energy storage devices containing non-aqueous electrolyte. The method comprises:

providing a current collector, comprising a metal conductive surface; desirably a thin metal substrate, preferably an aluminum foil substrate as is conventionally used in electrical energy storage devices; generally the current collector is bare metal, which may be cleaned and/or deoxidized;

applying a conductive primer composition as described herein to the current collector;

drying the conductive primer composition to form an adherent conductive primer layer, and optionally depositing a conductive coating composition comprising an active material on the adherent conductive primer layer before or after drying the conductive primer composition. If the conductive coating composition comprising an active material is deposited after drying of the primer composition, a second drying step is used to form active conductive coating layer.

The conductive primer composition which is applied to the current collector can include any of the features of the conductive primer composition as described in the preceding disclosure. The drying step desirably includes thermal drying at temperatures of 100, 125, 150, 175 or 200° C. for times of at least 10, 15, 20, 30 or 45 seconds and preferably not more than 120, 90, 60, 50 seconds. In some embodiments, the drying process includes cross-linking components of the conductive primer composition, the active conductive coating composition or both. In one embodiment, the primer layer and active layer are cross-linked to each other.

Methods of application of the compositions according to the invention include spraying; rolling, e.g. gravure; slot coating; and other methods of coil coating as are known in the art. For some application methods, the coating compositions may be diluted with additional water and/or solvent compatible with the composition and the application process in order to facilitate deposition at desired coating thicknesses/weights. Coating compositions according to the invention may be applied in amounts in a single coat or serially in multiple coats, a single coating step being preferred for economy. For primer coatings, the liquid coating compositions are deposited in an amount such that dried coating weight of the primer coating ranges from of 0.1 to 5 $g/m^2$, desirably 0.2 to 1 $g/m^2$. For conductive coating compositions used to form an active conductive coating, the conductive coating composition is applied in an amount such that dried coating weight of the active conductive coating ranges from 50 to 250 $g/m^2$.

In accordance with the foregoing disclosure, another embodiment of the subject invention includes an electrical energy storage device, for example a battery or a capacitor comprising a non-aqueous electrolyte, a coated current collector comprising a conductive coating as described herein, said coated current collector being in contact with the non-aqueous electrolyte and the conductive coating being insoluble in said non-aqueous electrolyte.

EXAMPLES

Example 1

Polymerization of an Organic Polymeric Binder Comprising at Least One Water-Soluble Polymer with Phosphorus Based Acid Functional Groups The following disclosure provides an example of polymerizing an organic polymeric binder according to the invention. Two-thousand twenty-five (2255) parts de-ionized water, two hundred fifty-one (251) parts acrylamide, three (3) parts vinyl phosphonic acid (VPA), one hundred thirty-three (133) parts n-methylol acrylamide (48% in water) and two hundred forty-six (246) parts isopropanol were added to a flask equipped with an agitator, condenser, nitrogen inlet and addition vessel, Five (5) parts ammonium persulfate were then dissolved in one hundred fifty-nine (159) parts de-ionized water and added to the addition vessel. The flask was placed under nitrogen atmosphere and heated to 65° C. The contents of the addition vessel were then introduced and a temperature of 80° C. was maintained. After the ammonium persulfate solution was fully added to the flask, a temperature of 80° C. was maintained for one hour after which the flask was cooled to ambient temperature.

The resulting water-soluble polymer comprised an n-methylol functionalized acrylamide co-polymer which bears phosphorus based acid groups bound thereto in an amount of 0.25-10.0% weight percent, based on total amount of water soluble polymer present. Specifically, phosphorus based acid groups comprised 0.71 wt of the water soluble polymer of Example 1.

Example 2

Preparation of Conductive Particle Dispersion #1

As noted above, in one embodiment the conductive primer composition also includes conductive particles which are insoluble in water as well as in the non-aqueous electrolyte. The conductive particles include at least one of carbon black, graphite, and/or graphene. In one embodiment, as will be discussed in more detail below, the conductive particles include carbon black, graphite, and graphene. The following disclosure provides two non-limiting examples of the formulation and manufacturing steps for the conductive particles as incorporated into the conductive primer composition of the first embodiment.

| | Conductive Particle Dispersion #1 Material | Wt Added | Wt % |
|---|---|---|---|
| Part A | Deionized water | 2753.9 | 68.8 |
| | Hydroxyethyl cellulose | 14.2 | 0.4 |
| | Biocide | 5.9 | 0.1 |
| Part B | Polyvinylpyrrolidone powder | 77.0 | 1.9 |
| | Wetting agent | 5.9 | 0.1 |
| Part C | Conductive carbon black | 284.3 | 7.1 |
| Part D | Graphite | 858.8 | 21.5 |
| | Total | 4000.0 | 100 |

In manufacturing, Part A was loaded to a mixing vessel equipped with a high speed dispersion blade and then mixed at high speed for fifteen (15) minutes after which part B was added. After fifteen (15) additional minutes of mixing part A and part B, part C was added, followed by addition of part D. High speed mixing was then continued for approximately two (2) hours to obtain a premix. This premix was then passed through a media mill to provide a median particle size of 13.7 microns. The resultant conductive particle dispersion had solids of 34.0% and a pH of 8.5.

Example 3

Preparation of Conductive Particle Dispersion #2

For Example 3, a premix was made according to the procedure described for Example 2, using the components shown in the table below. This premix was then passed through a media mill to provide a median particle size of 13.9 microns. The resultant conductive particle dispersion had solids of 34.0% and a pH=8.2.

| | Conductive Particle Dispersion #2 Material | Wt Added | Wt % |
|---|---|---|---|
| Part A | Deionized water | 2753.9 | 68.8 |
| | Hydroxyethyl cellulose | 14.2 | 0.4 |
| | Biocide | 5.9 | 0.1 |
| Part B | Polyvinylpyrrolidone powder | 77.0 | 1.9 |
| | Wetting agent | 5.9 | 0.1 |
| Part C | Conductive carbon black | 190.5 | 4.8 |
| Part D | Graphite | 952.6 | 23.8 |
| | Total | 4000.0 | 100 |

Example 4

Preparation of a Conductive Primer Composition of the Invention

An example of a conductive primer composition according to the invention was made using an organic polymeric binder made according to Example 1 with the components recited below:

| Conductive Primer Composition #1 | Weight % |
|---|---|
| Organic polymeric binder including water-soluble, phosphorus acid functional polymer (See Example 1) (10.5% solids) | 48.3 |
| Non-phosphorus acid functional polymer | 0 |
| Conductive Particle Dispersion #1 (See Example 2) | 41.5 |
| Deionized water | 10.2 |
| Total | 100.0 |

These components were mixed to form Conductive Primer Composition #1 As illustrated in the above table, the conductive primer composition included an organic polymeric binder according to the invention as described above in Example 1. The conductive primer composition included about 3 wt % carbon black and about 9 wt % graphite.

Example 5

Preparation of a Comparative Example Conductive Primer Composition

The components recited in the table below were mixed to form Conductive Primer #2 (Comparative Example). The comparative example formulation polymer provided similar solids content of polymer to the conductive primer as that of Conductive Primer Composition #1:

| Conductive Primer Composition #2 (Comparative Example 1) | Weight % |
|---|---|
| Non-water soluble, non-phosphorus acid functional polymer (40% solids) | 12.8 |
| Conductive Particle Dispersion #1 (See Example 2) | 41.5 |
| Deionized water | 45.7 |
| Total | 100.0 |

As illustrated in the formulation above, the Conductive Primer #2 (Comparative Example) does not include an organic polymeric binder that has at least one water-soluble polymer binder bearing phosphorus based acid groups. Total solids of the polymeric binder present in both primers were comparable: The Example of the invention was 5.1 wt % polymeric binder solids and the Comparative Example was 5.1 wt % polymeric binder solids.

Example 6

Polymerization of a Water-Soluble Polymer Bearing Phosphorus Based Acid Groups

In this example, two-thousand three hundred and twenty-five (2325) parts de-ionized water, three hundred and six (306) parts acrylamide, six (6) parts vinyl phosphonic acid, and two hundred and fourteen (214) parts isopropanol were added to a flask equipped with an agitator, a condenser, a nitrogen inlet, and an addition vessel. Five (5) parts ammonium persulfate was dissolved in one hundred and fifty (150) parts de-ionized water and the mixture was then added to the addition vessel. The flask was put under nitrogen atmosphere and heated to 65° C. The contents of the addition vessel were then introduced and a temperature of 80° C. was maintained. After the ammonium persulfate solution was fully added to the flask, a temperature of 80° C. was maintained for one hour after which the flask was cooled to ambient temperature. Phosphorus based acid groups comprised 1.4 wt % of the water soluble polymer. Ammonium hydroxide was then added such that a solution pH of 8 was reached.

Example 7

Preparation of Conductive Primer Compositions of the Invention

Three conductive primer compositions, Conductive Primer Composition #3 and Conductive Primer Composition #4, were made by combining the water-soluble polymer bearing phosphorus based acid groups of Example 6 with a second water-soluble polymer that did not contain phosphorus based acid groups and other components as listed below. A third conductive primer composition, Conductive Primer Composition #5, was made using a different water-soluble polymer bearing phosphorus based acid groups (a VPA acrylic acid co-polymer) as shown below.

| Component | Conductive Primer Composition #3 (wt. %) | Conductive Primer Composition #4 (wt. %) | Conductive Primer Composition #5 (wt. %) |
|---|---|---|---|
| 10% aqueous solution of hydroxyethyl cellulose | 29.6 | 29.6 | 31.6 |
| Urea formaldehyde crosslinking agent | 1.8 | 1.8 | 1.9 |
| Example 6 | 3.5 | 3.5 | |
| VPA and acrylic acid co-polymer (8.8% solution) | | | 0.5 |
| Blocked sulfonic acid-based catalyst (25 wt % solution) | 0.1 | 0.1 | 0.1 |
| Conductive Particle Dispersion #1 (See Example 2) | 41.5 | — | 41.5 |
| Conductive Particle Dispersion #2 (See Example 3) | — | 41.5 | |
| Deionized water | 9.0 | 9.0 | 9.6 |
| Isopropanol | 14.8 | 14.8 | 14.8 |
| Total | 100.0 | 100.0 | 100.0 |

Prior to addition to the composition, the co-polymer of vinyl phosphonic acid and acrylic acid was neutralized to a pH of 7 with ammonium hydroxide Example 8

Preparation and Testing of Conductive Primer Coating Layers of the Invention and a Comparative Example Each of Conductive Primer Compositions #1 to #5 was individually applied directly to separate pieces of clean aluminum foil, at a dry coating weight of 0.3 g/m2 and dried in a heat forced air oven for thirty (30) seconds at a temperature of 110° C. The primed foils, each having one of the conductive primer compositions dried thereon to form a current collector having a dried conductive primer coating, was characterized directly and after subsequent application of an active coating layer. The non-aqueous electrolyte used in the testing was 1 M LiPF6 dissolved in a mixture of carbonate solvents. In cases where the primer coating layer was characterized directly it was first post-heated in conditions similar to those employed in thermal drying of the active coating. The post-heating condition used to simulate what would be done during thermal drying of applied active coating was 1 hour @ 120° C. under vacuum. The adhesion, resistance to electrolyte attack/solvent dissolution, and electrical contact resistance of the primed foils having the dried conductive primer coating deposited thereon were compared using the below described tests:

Adhesion:

The conductive primer layer generated by applying and drying conductive primer compositions, as described above, were tested for adhesion of the conductive primer layer to the aluminum foil within a dry box compartment. For purposes of this test, adhesion of primer to the foil was characterized by immersing the primed foil (meaning the foil having the dried conductive primer layer deposited on its surface) in a non-aqueous electrolyte within a sealed container, heating it for a specified time and temperature (i.e., 2 hours at a temperature of 85° C.). The primed foil was removed from the electrolyte, excess solvent was removed by contacting with a clean paper towel and thereafter the adhesion of the primer layer to the foil was determined by applying Scotch brand adhesive tape #610 to the primed foil surface, pulling the tape off at an angle of 90° to the primed foil surface, and observing what percent of the tested area had primer coating loss.

Electrolyte Resistance:

The conductive primer layers were tested for resistance to exposure to non-aqueous electrolyte within a dry box compartment. This test is significant because the conductive primer layers formed from the conductive primer compositions will be exposed to or immersed in non-aqueous electrolyte in the electrical energy storage device for the life of the electrical energy storage device. Electrolyte resistance was characterized by immersing the primed foil in electrolyte as described for the adhesion test. The primed foil was removed from the electrolyte, excess solvent was removed by contacting with a clean paper towel and thereafter the primed foil was rubbed using a cotton swab saturated with N-Methyl-2-pyrrolidone (NMP), and the number of double rubs before primer was visibly removed was recorded. Rubbing was discontinued if the primer was still intact after 100 double rubs was reached.

Contact Resistance/Electrical Conductivity:

The conductive primer layers were tested for electrical conductivity by testing contact resistance of the primed foil as well as contact resistance of the primed foil having deposited and dried thereon an active coating. All samples were tested at a fixed coating weight, fixed contact area and fixed load. The higher the tested value of resistance per unit area, the poorer the performance of the coated current collector, e.g. electrode. This test is significant because low electrical resistance, is a key performance feature required of a coated current collector, e.g. primed foil, to be useful in electrical energy storage devices.

The use of a water-soluble polymer which bears phosphorus based acid groups in an organic polymeric binder of the conductive primer composition improves performance as compared to the comparative example formulation. The following experimental results provide objective test data to support this conclusion.

| Primer used to form Primer layer tested | % Adhesion Loss (Tape Pull) After Aging In Heated Electrolyte | Solvent Resistance After Aging In Heated Electrolyte | Contact Resistance of Primed Foil Ohms/Cm$^2$ | Contact Resistance of Primed Foil + Active Coating (Lithium Iron Phosphate) Ohms/Cm$^2$ |
|---|---|---|---|---|
| Conductive Primer #2 (Comparative Example) | 27% | 1 | .08 | 0.72 |
| Conductive Primer Composition #1 | 0% | >100 | .05 | 0.15 |
| Conductive Primer Composition #3 | 0% | >100 | .03 | 0.29 |
| Conductive Primer Composition #4 | 0% | >100 | .03 | 0.24 |
| Conductive Primer Composition #5 | 0% | 28 | .03 | 0.49 |

As shown above, use of the conductive primer composition according to the invention, Conductive Primer Compositions #1 and 3-5, to form a conductive primer layer resulted in zero adhesion loss of the conductive primer layer from the aluminum foil. A primer layer of Conductive Primer #2 (Comparative Example) was subjected to the same adhesion test with test results of 27% adhesion loss.

Resistance to exposure to heated non-aqueous electrolyte typically used in lithium containing energy storage devices, as determined by assessing resistance to solvent after aging in heated electrolyte, was at least 25 times better in the conductive primer layers according to the invention as compared to primer layers made from the comparative example. Among compositions according to the invention, significantly improved resistance to electrolyte was observed for primers based on Conductive Primer Compositions 1, 3 and 4, which were more than 3 times better than the primer based on Conductive Primer Composition #5 and 100 times better than the comparative example.

Finally, conductive primer layers according to the invention showed markedly decreased electrical contact resistance both in the primed foil and in the primed foil plus active coating as compared to the primer layer of Conductive Primer #2 (Comparative Example). Surprisingly, the primed foil contact resistance for the inventive primer layer from Conductive Primer Composition #1 showed a reduction over the comparative example of more than 37%, and the improvement was even greater for the primed foil plus active coating layer, which showed a reduction in contact resistance of about 79%.

Example 9

Testing of an Acrylamide-Containing Water-Soluble Polymer Bearing Phosphorus Based Acid Groups as an Additive to Conductive Primer Compositions A water-soluble polymer bearing phosphorus based acid groups made according to Example 6 was tested as an additive for use in two commercially available conductive primer compositions comprising non-water soluble binders.

In all examples, adhesion of the primer to the foil was characterized before and after modification with the phosphorus-based acid functional water-soluble polymer incorporated as an additive. Both the unmodified and modified primers as described below were applied to foil at 0.6 g/m$^2$ and dried for one (1) minute at 204° C. The primed foils were tested according to the procedure described in Example 8.

| Primer used to form Primer layer tested | Conductive Primer Formulation | Additive | % adhesion loss (Tape) after heated electrolyte |
|---|---|---|---|
| Conductive Primer Composition #6 | Acrylic/melamine- based thermosetting primer containing graphite and carbon black | Example 6 added at 2%* | 1% |
| Comparative Example 2 | Acrylic/melamine- based thermosetting primer containing graphite and carbon black | None | 30% |
| Conductive Primer Composition #7 | Thermoplastic primer based on graphite and carbon black | Example 6 added at 2%* | 0% |
| Comparative Example 3 | Thermoplastic primer based on graphite and carbon black | None | 55% |

*The primers were modified by addition of Example 6 in an amount to provide the coating with 2 wt % of the water-soluble polymer measured as a percent of dry coating weight.

As evidenced by the experimental results, in both situations, the incorporation of the additive containing acrylamide based polymer into the conductive primer compositions results in improved adhesion performance when compared to identical conductive primer compositions which do not include the additive.

Example 10

Preparation of Conductive Particle Dispersion #3

As discussed above with regard to the conductive primer composition, the conductive particles can include carbon black, graphite, and graphene. In accordance with this disclosure, the following two examples provide modifications of the makeup of the conductive particle dispersion of Example 2 wherein a portion of the carbon black has been removed and replaced with an equal weight of nano-graphene. In this preferred embodiment, the graphene is present in a weight ratio of approximately 0.2:1 to 5:1 with respect to the carbon black.

Conductive Particle Dispersion #3 was made from the below listed components according to the procedure described in Example 2. (0.5:1 graphene:carbon black)

| | Material | Wt Added |
|---|---|---|
| Part A | Deionized water | 2753.9 |
| | Hydroxyethyl cellulose | 14.2 |
| | Biocide | 5.9 |
| Part B | Polyvinylpyrrolidone powder | 77.0 |
| | Wetting agent | 5.9 |
| Part C | Conductive carbon black | 189.5 |
| Part D | Graphite | 858.8 |
| Part E | Nano-graphene | 94.8 |
| | Total | 4000.0 |

Conductive Particle Dispersion #3 illustrates the replacement of ⅓ of the weight of carbon black with nano-graphene.

Example 11

Formulation of Conductive Particles #4

Conductive Particle Dispersion #4 was made from the below listed components according to the procedure described in Example 2. Conductive Particle Dispersion #4 illustrates the replacement of ⅔ of the weight of carbon black with nano-graphene. (2:1 graphene:carbon black)

| | Material | Wt Added |
|---|---|---|
| Part A | Deionized water | 2753.9 |
| | Hydroxyethyl cellulose | 14.2 |
| | Biocide | 5.9 |
| Part B | Polyvinylpyrrolidone powder | 77.0 |
| | Wetting agent | 5.9 |
| Part C | Conductive carbon black | 94.8 |
| Part D | Graphite | 858.8 |
| Part E | Nano-graphene | 189.5 |
| | Total | 4000.0 |

Example 12

Comparison of Formulations of Conductive Coating Compositions Based on Conductive Particle Content The various conductive particles, i.e., "Conductive Particles #1", "Conductive Particles #3", and "Conductive Particles #4", were incorporated into various conductive coating compositions as illustrated in the following exemplary formulations.

| | Conductive Primer Composition No. | | | | |
|---|---|---|---|---|---|
| Component | #8 | #9 | #10 | #11 | #12 |
| 8.3% aqueous solution of hydroxyethylcelluiose | 42.1 | 42.1 | 42.1 | | |
| Water-soluble polymer of Example 1 | | | | 48.0 | 48.0 |
| Methylated High Imino Melamine crosslinking agent | 1.21 | 1.21 | 1.21 | | |
| Water-soluble polymer of Example 6 | 3.2 | 3.2 | 3.2 | | |
| Conductive Particle Dispersion #1 | 39.4 | | | 41.7 | |
| Conductive Particle Dispersion #3 | | 39.4 | | | 41.7 |
| Conductive Particle Dispersion #4 | | | 39.4 | | |
| Deionized water | | | | 10.3 | 10.3 |
| Methoxy-propanol | 14.0 | 14.0 | 14.0 | | |
| Blocked acid catalyst | 0.1 | 0.1 | 0.1 | | |
| Total | 100.0 | 100.0 | 100.0 | 100.0 | 100.0 |

Conductive Primer Compositions #8-12 were applied to aluminum foil and dried for one minute at 204° C. yielding a dry weight of 0.3 g/m$^2$.

The resulting dried primer coatings were tested for electrochemical stability according to the linear sweep voltammetry (LSV) and Change in Onset Voltage experimental tests, as follows: Electrochemical stability rating was obtained by linear sweep voltammetry of each primed foil in $LiPF_6$ electrolyte. Ratings were based on area under the curve and onset potential. Area under the curve corresponds to the total oxidation current occurring as the voltage is swept in a simulation of battery charging, where lower percentages indicate better performance. Onset voltage increases which are higher indicate better electrochemical stability. LSV Onset for this test was defined as the voltage at which the current exceeds $5\times10^{-6}$ Amps/cm$^2$. LSV and onset voltage was determined for each dried primer coating.

As illustrated in the following test results, the electrochemical stability of a conductive primer coating improves as the level of graphene in the Conductive Primer Composition formulation increases. This is particularly significant because the enhancements of the electrochemical stability of the primed foil make the conductive primer composition more suitable for use with a variety of types of active coatings which operate over different voltage ranges.

| Conductive Primer Composition | LSV area (Current/cm$^2$) | Change in Onset Voltage |
|---|---|---|
| Conductive Primer Composition #8 | 100% | None |
| Conductive Primer Composition #9 | 45% | Increase 0.2 V |
| Conductive Primer Composition #10 | 22% | Increase 0.3 V |
| Conductive Primer Composition #11 | 100% | None |
| Conductive Primer Composition #12 | 16.8% | Increase 0.24 V |

Example 13

Comparison of Formulations of Conductive Coating Compositions Based on Graphene Conductive Particle Content In another example, primer compositions which incorporate a conductive particle dispersion which substitutes a portion of the carbon black for graphene showed an improvement in the chemical resistance of the primer composition after heated electrolyte exposure. Formula preparation is shown below and first includes performing a wetting operation followed by a grinding operation to obtain the final material.

| | Material (g) | Conductive Particle Dispersion #5 | Conductive Particle Dispersion #6 | Conductive Particle Dispersion #7 |
|---|---|---|---|---|
| Part A | DI water | 186.2 | 186.2 | 186.2 |
| | Hydroxyethyl cellulose | 1.0 | 1.0 | 1.0 |
| | Biocide | 0.4 | 0.4 | 0.4 |
| Part B | Dispersing Agent | 5.2 | 5.2 | 5.2 |
| | Wetting Agent | 0.4 | 0.4 | 0.4 |
| Part C | Conductive carbon black particles | 19.2 | 12.8 | 6.4 |

-continued

| | Material (g) | Conductive Particle Dispersion #5 | Conductive Particle Dispersion #6 | Conductive Particle Dispersion #7 |
|---|---|---|---|---|
| Part D | Conductive graphite | 58.0 | 58.0 | 58.0 |
| Part E | Conductive nano-graphene | 0 | 6.4 | 12.8 |
| Total (g) | | 270.4 | 270.4 | 270.4 |

Manufacturing of the conductive particles, or conductive paste as it is referred to in the table, first included adding water to a stainless steel vessel that was fixed to a high-speed disperser using a Cowles blade. Part A components were combined with mixing. Part B was then added, and then Parts C, D, and E were added. The entire paste or conductive particles were then mixed at 1700 rpms for an hour. The wet conductive particles slurry was then subjected to grinding to reduce particle size. Particle size by light scattering shows the following D90 (90% of the particles were below this size).

| | Conductive Particle Dispersion #5 | Conductive Particle Dispersion #6 | Conductive Particle Dispersion #7 |
|---|---|---|---|
| D90 (microns) | 19.9 | 37.0 | 38.3 |

These conductive particles were then used as shown below to prepare conductive primers with or without conductive particles that include graphene.

| Material | Conductive Primer Composition #13 Wt Added(g) | Conductive Primer Composition #14 Wt Added(g) | Conductive Primer Composition #15 Wt Added(g) |
|---|---|---|---|
| 5% aqueous solution of hydroxyethylcellulose | 51.1 | 51.1 | 51.1 |
| 80% alcohol solution imino melamine crosslinker | 0.9 | 0.9 | 0.9 |
| Water soluble additive (see Example 6) | 2.4 | 2.4 | 2.4 |
| 25% solution blocked sulfonic acid catalyst | 0.1 | 0.1 | 0.1 |
| DI Water | 6.7 | 6.7 | 6.7 |
| Isopropanol | 10.2 | 10.2 | 10.2 |
| Conductive Particle Dispersion #5 | 28.7 | | |
| Conductive Particle Dispersion #6 | | 28.7 | |
| Conductive Particle Dispersion #7 | | | 28.7 |
| Total | 100.0 | 100.0 | 100.0 |

The primer samples were then applied to aluminum foil and dried for one minute at 204° C. yielding a dry weight of 0.3 g/m$^2$. Electrolyte resistance was then determined as described above in Example 4. Both sides of the foil were coated and ratings were given for both sides.

As shown in the ensuing results, the incorporation of graphene into the conductive primer composition improves the electrolyte resistance of the primer composition after heated electrolyte exposure. In particular, significantly improved results were shown when two-thirds of the carbon-black of the control conductive particles was replaced with graphene, i.e., graphene paste B.

| Conductive Primer Composition | Conductive particles Pastes used for Primers | Post Electrolyte Double Rubs |
|---|---|---|
| Conductive Primer Composition #13 | Conductive Particle Dispersion #5 | 3<br>3 |
| Conductive Primer Composition #14 | Conductive Particle Dispersion #6 | 2<br>2 |
| Conductive Primer Composition #15 | Conductive Particle Dispersion #7 | >100<br>>100 |

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in my ways. Such variations are not to be regarded as a departure from the invention, and all such modifications are intended to be included within the scope of the invention.

What is claimed is:

1. A conductive primer composition for use on a current collector within an electrical energy storage device containing a non-aqueous electrolyte, said conductive primer composition comprising:

(a) an organic polymeric binder comprising one or more water-soluble polymers;

(b) a solvent system comprising water;

(c) phosphorus based acid bound to at least one of said water-soluble polymers, said phosphorus based acid present in a range of 0.025-10.0% by weight based on a total weight of said one or more water-soluble polymers and wherein said at least one of said one or more water-soluble polymers having phosphorus acid bound thereto is made up of at least 70 wt % of one or more monomers selected from the group consisting of acrylamide, n-methylol acrylamide, methacrylamide, n-methylol methacrylamide, vinylformamide, and n-methylol vinylformamide; and (d) conductive particles, said conductive particles present in an amount of from 45 to 80% by weight based on a total dried primer composition weight.

2. The conductive primer composition as set forth in claim 1 wherein said at least one of said one or more water-soluble polymers having phosphorus acid bound thereto is a copolymer comprising the monomer acrylamide.

3. The conductive primer composition as set forth in claim 1 wherein said organic polymeric binder further comprises one or more water-dispersible polymers dispersed in the composition.

4. The conductive primer composition as set forth in claim 1 wherein a source of said phosphorus based acid comprises at least one of vinyl phosphonic acid, vinyldiphosphonic acid, and a phosphate ester monomer based on (meth)acrylic acid.

5. The conductive primer composition as set forth in claim 1 further comprising a cross-linker.

6. The conductive primer composition as set forth in claim 1 wherein said conductive particles are selected from the group consisting of carbon black, graphite, graphene and mixtures thereof.

7. The conductive primer composition as set forth in claim 6 wherein said conductive particles comprise carbon black, graphite, and graphene, and wherein said graphene and said carbon black are present in a weight ratio of approximately 0.2:1 to 5:1.

8. A conductive primer composition for use on a current collector within an electrical energy storage device containing a non-aqueous electrolyte, said conductive primer composition comprising:

water;

one or more organic polymers dissolved and/or dispersed in the water; and conductive particles dispersed in the water, said conductive particles present in an amount of from 45 to 80% by weight based on a total dried primer composition weight; and wherein at least one of said one or more organic polymers comprises at least 70 wt % in total of monomers selected from the group consisting of acrylamide, n-methylol acrylamide, methacrylamide, n-methylol methacrylamide, vinylformamide, and n-methylol vinylformamide and further comprises phosphorus acid bound to said organic polymer in an amount of 0.025-10.0% by weight based on a total weight of said organic polymer.

9. A method of manufacturing a coated current collector for use within an electrical energy storage device containing a non-aqueous electrolyte, comprising steps of:

a.) providing a current collector comprising a metal conductive surface; and b.) applying a conductive primer composition according to any one of claims 1 and 3-8 directly to the metal conductive surface; and c.) drying, and optionally cross-linking, the conductive primer composition on the metal conductive surface to form an adherent conductive primer layer.

10. The method of manufacturing a coated current collector as set forth in claim 9 further comprising a step of:

depositing a conductive coating composition comprising an active material on the adherent conductive primer layer before or after step c.); and drying, and optionally cross-linking, to form an electrode.

11. A conductive coating composition for electrical energy storage devices containing a non-aqueous electrolyte, said conductive coating composition comprising:

an organic binder;

conductive particles dispersed in said organic binder, said conductive particles present in an amount of from 45 to 80% by weight based on a total dried conductive coating composition weight; and an organic polymer bearing phosphorus based acid, said phosphorus based acid present in a range of 0.05-2.0% by weight based on a total weight of said organic polymer, and said organic polymer being different from said organic binder, wherein said organic polymer comprises at least 70% by weight of one or more monomers selected from the group consisting of acrylamide, n-methylol acrylamide, methacrylamide, n-methylol methacrylamide, vinylformamide, and n-methylol vinylformamide said organic polymer present in a range of 0.1-5.0 weight % based on total dry solids of said conductive coating composition.

12. The conductive coating composition as set forth in claim 11 wherein said phosphorus based acid is selected from at least one of vinyl phosphonic acid, vinyldiphosphonic acid, and a phosphate ester monomer based on (meth) acrylic acid.

13. The conductive composition as set forth in claim 11 wherein said conductive particles comprise at least one of carbon black, graphite, and graphene.

14. The conductive composition as set forth in claim 13 wherein said conductive particles comprise at least carbon black and graphene, and wherein said graphene and said carbon black are present in a weight ratio of approximately 0.2:1 to 5:1.

15. A coated current collector for use within an electrical energy storage device containing a non-aqueous electrolyte, said coated current collector comprising:

A) a conductive metal surface; and

B) a conductive primer layer adhered directly to said conductive metal surface;

wherein said conductive primer layer comprises conductive particles, said conductive particles present in an amount of from 45 to 80% by weight based on a total dried conductive primer layer weight, and an organic polymeric binder comprising one or more organic polymers wherein at least one of said one or more organic polymers comprises 70% by weight or more of monomers selected from the group consisting of acrylamide, n-methylol acrylamide, methacrylamide, n-methylol methacrylamide, vinylformamide, and n-methylol vinylformamide and further comprises phosphorus acid bound to said at least one of said one or more organic polymers in an amount of 0.025-10.0% by weight based on a total weight of said one or more organic polymers.

16. The coated current collector as set forth in claim 15 wherein said conductive primer layer is cross-linked.

17. The coated current collector as set forth in claim 16 wherein said conductive particles include carbon black, graphite, and graphene.

18. An electrode comprising the coated current collector of claim 15 having deposited on said conductive primer layer an active conductive coating.

19. An electrical energy storage device comprising:

the coated current collector as set forth in claim 15; and a non-aqueous electrolyte;

wherein said conductive primer layer is insoluble in said non-aqueous electrolyte.

* * * * *

UNITED STATES PATENT AND TRADEMARK OFFICE

CERTIFICATE OF CORRECTION

PATENT NO. : 9,819,023 B2
APPLICATION NO. : 14/087845
DATED : November 14, 2017
INVENTOR(S) : John D. McGee et al.

It is certified that error appears in the above-identified patent and that said Letters Patent is hereby corrected as shown below:

In the Specification

Column 19, Line 45: Change “hydroxyethylcelluiose” to -- hydroxyethylcellulose --.

Signed and Sealed this
Twenty-first Day of August, 2018

Andrei Iancu
*Director of the United States Patent and Trademark Office*